US009829933B1

(12) United States Patent
Yang et al.

(10) Patent No.: US 9,829,933 B1
(45) Date of Patent: Nov. 28, 2017

(54) LATCH MECHANISMS FOR COVERS

(71) Applicant: Hewlett Packard Enterprise Development LP, Houston, TX (US)

(72) Inventors: Shou-Jen Yang, Taipei (TW); Earl W. Moore, Houston, TX (US); David A. Selvidge, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/340,326

(22) Filed: Nov. 1, 2016

(51) Int. Cl.
| | |
|---|---|
| *H05K 7/16* | (2006.01) |
| *A47B 81/00* | (2006.01) |
| *G06F 1/18* | (2006.01) |
| *E05B 65/00* | (2006.01) |
| *E05C 19/12* | (2006.01) |
| *E05C 3/38* | (2006.01) |
| *E05B 13/00* | (2006.01) |

(52) U.S. Cl.
CPC ............ *G06F 1/181* (2013.01); *E05B 13/001* (2013.01); *E05B 65/006* (2013.01); *E05C 3/38* (2013.01); *E05C 19/12* (2013.01)

(58) Field of Classification Search
CPC ........ E05B 13/001; E05B 65/006; E05C 3/38; E05C 19/12; G06F 1/181
USPC ............ 361/679.31–679.39, 726; 312/223.2
See application file for complete search history.

(56) References Cited

U.S. PATENT DOCUMENTS

| | | | | |
|---|---|---|---|---|
| 5,823,644 | A * | 10/1998 | Suh | ........................ G06F 1/181 292/124 |
| 6,158,105 | A * | 12/2000 | Suh | ..................... E05B 73/0082 29/453 |
| 6,637,847 | B2 | 10/2003 | Crisp et al. | |
| 7,054,144 | B2 | 5/2006 | Heistand, II et al. | |
| 7,404,610 | B2 | 7/2008 | Smith et al. | |
| 7,551,427 | B1 | 6/2009 | Blaugrund et al. | |
| 8,089,757 | B2 * | 1/2012 | Chen | ..................... G06F 1/1626 174/66 |
| 8,419,082 | B2 * | 4/2013 | Wu | ........................ G06F 1/181 292/116 |

(Continued)

FOREIGN PATENT DOCUMENTS

| | | |
|---|---|---|
| CN | 201134258 | 10/2008 |
| CN | 201315163 | 9/2009 |

(Continued)

OTHER PUBLICATIONS

Replacing a hard disk drive module, Retrieved from Internet Oct. 14, 2016, 3 pps., https://www.ibm.com/support/knowledgecenter/SS9H2Y_7.1.0/com.ibm.dp.doc/8436_replacingharddiskdriveassembly.html.

(Continued)

*Primary Examiner* — Nidhi Thaker
(74) *Attorney, Agent, or Firm* — Hewlett Packard Enterprise Patent Department

(57) ABSTRACT

Examples described herein include latch mechanisms for covers. In some examples, an electronic device has an enclosure, a cover, and a latch mechanism. The enclosure may include an opening. The latch mechanism may include a rotatable arm, a spring to bias the rotatable arm to secure the cover to the enclosure, and a cam moveable between a rest position and an engaged position. In the engaged position, the cam moves the rotatable arm to release the cover.

15 Claims, 7 Drawing Sheets

(56) References Cited

U.S. PATENT DOCUMENTS

| | | | | |
|---|---|---|---|---|
| 8,622,646 B2* | 1/2014 | Quan | ............... | H05K 5/0239 |
| | | | | 361/679.39 |
| 8,640,330 B2* | 2/2014 | Peng | ............... | G11B 33/124 |
| | | | | 29/764 |
| 2007/0230105 A1* | 10/2007 | Su | ............... | G06F 1/187 |
| | | | | 361/679.33 |

FOREIGN PATENT DOCUMENTS

| | | |
|---|---|---|
| CN | 202217507 | 5/2012 |
| CN | 104615213 | 5/2015 |
| CN | 205193808 | 4/2016 |

OTHER PUBLICATIONS

ReadyNAS OS 6: Adding a Disk to Desktop Models, NETGEAR, Aug. 19, 2016, 9 pps, <http://kb.netgear.com/app/answers/detail/a_id/22894/~/readynas-os-6%3A-adding-a-disk-to-desktop-models>.

* cited by examiner

LATCH MECHANISMS FOR COVERS

BACKGROUND

Electronic devices may be vulnerable to physical security attacks. For example, an electronic storage device that is not secure may be accessed by unauthorized personnel. Thus, electronic devices may rely on precautions such as locks to mitigate these physical security attacks.

BRIEF DESCRIPTION OF THE DRAWINGS

The following detailed description references the drawings, wherein.

DETAILED DESCRIPTION

Figure 1:
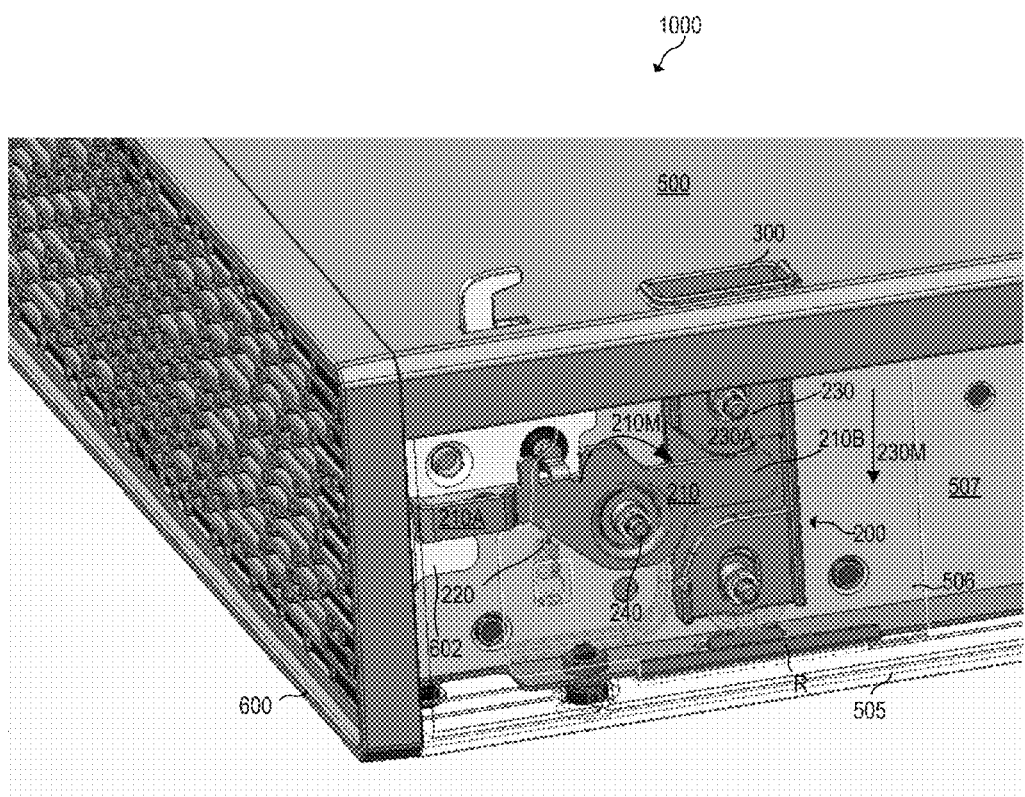
FIG. 1 illustrates an electronic device with a latch mechanism, according to some examples.

The security of an electronic device contributes to the overall integrity of the data handled by the electronic device. In some situations, an electronic device that handles or processes data in a public location is vulnerable to physical attacks due to the location of operation. For example, a point of sale device (e.g., a cash register, etc.) operates at the location of the sale and may be easy accessible to unauthorized personnel. Thus, security measures such as keyed locks may be used to prevent physical access of electronic components stored in electronic devices to unauthorized personnel. The keyed locks may also prevent unauthorized removal of the electronic components.

However, the use of keyed locks may be cumbersome. This is especially true when the electronic device has individual components that are housed in separate enclosures or housings. For example, in an electronic device performing data processing functions, a processing component may be housed separately from an associated storage component. Accordingly, one keyed lock may be used to secure the processing component while another keyed lock may be used to secure the associated storage component. Additionally, the associated storage component may have an internal chamber to store disk drives. The internal chamber may be vulnerable to physical security attacks such as the removal of a disk drive. Accordingly, yet another separate keyed lock may be used to secure access to this internal chamber of the associated storage component. Accordingly, three keyed locks may be required for one electronic device resulting in cumbersome and inefficient security measures.

Examples disclosed herein address these technical challenges by providing a keyless latch mechanism to automatically secure the components of an electronic device. The latch mechanism may be biased to secure a cover to a housing of the electronic device to block access to an internal chamber in the electronic device. Accordingly, a cover that is attached to the housing may automatically be secured without a keyed mechanism. Additionally, examples disclosed herein may block access to the latch mechanism depending on the operation of the electronic device. For example, a button that operates the latch mechanism may be blocked when the electronic device is in operational mode. Examples disclosed herein also allow for securing components housed in different housings with fewer keyed locks. Thus, examples disclosed herein allow for a simple and automatic security measure that secures an electronic device with multiple components.

In some examples, an electronic device is provided with an enclosure, a cover, and a latch mechanism. The enclosure has an opening. The latch mechanism includes a rotatable arm, a spring to bias the rotatable arm to secure the cover to the enclosure, and a cam moveable between a rest position and an engaged position. In the engaged position, the cam moves the rotatable arm to release the cover.

In some examples, an electronic storage device is provided with an enclosure, a cover, and a latch mechanism. The enclosure has an opening. The cover has a protruding arm. The latch mechanism is to secure the cover to the enclosure and includes a rotatable lever and a cam. The rotatable lever is biased to engage with the protruding arm. The cam is biased in a first position and is moveable between the first position and a second position. In the second position, the cam moves the rotatable lever to disengage the protruding arm.

In some examples, a computing device comprises a first housing with a first surface, a second housing with an opening and a second surface, a cover to close the opening, and a latch mechanism to secure the cover to the second housing. The second housing is removably attached to the first housing through a connection of the first surface to the second surface. The latch mechanism includes a button the second surface, a rotatable lever biased to secure the cover to the second housing, and a cam operatively connected to the button and moveable between a rest position and an engaged position. In the engaged position, the cam moves the rotatable arm to release the cover from the second housing.

Figure 2:
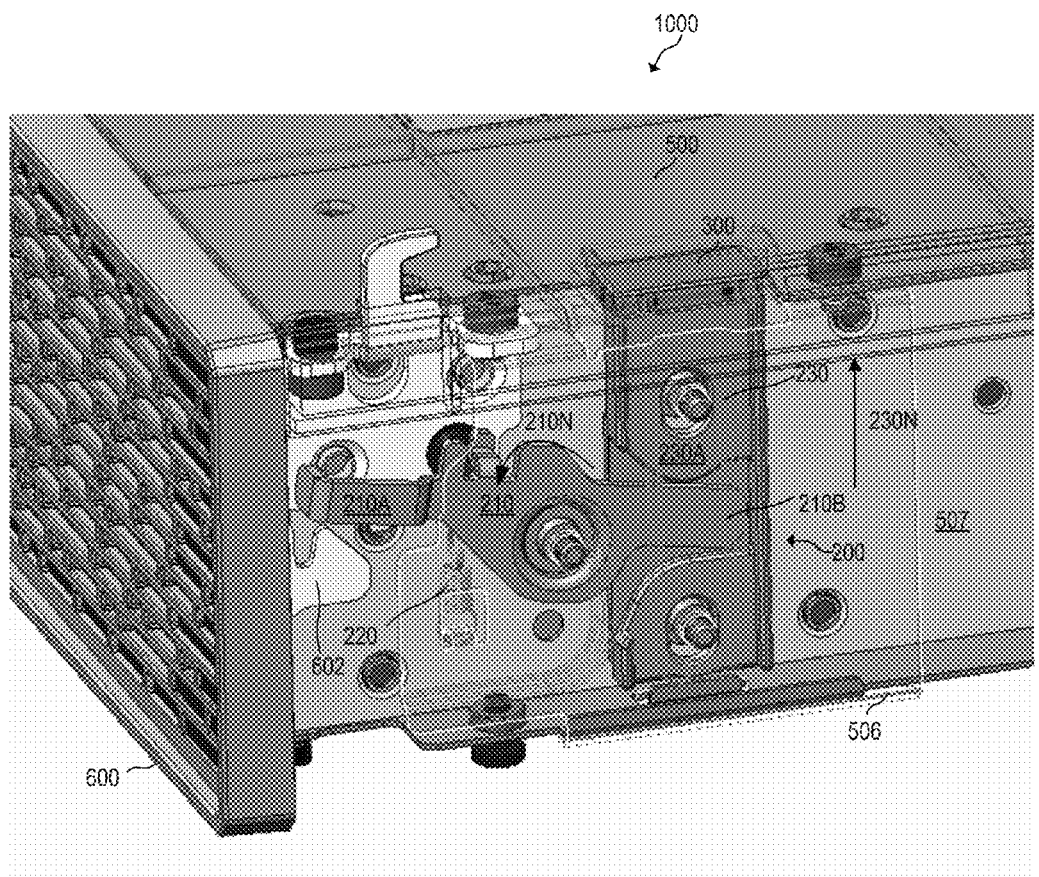
FIG. 2 illustrates the latch mechanism shown in FIG. 1 in a position that releases a cover, according to some examples.

Referring now to the figures, FIGS. 1 and 2 illustrate an electronic device 1000. Electronic device 1000 includes an enclosure 500, a cover 600, and a latch mechanism 200. Electronic device, as used herein, may include any device with an electrical component. Non-limiting examples include a point of sale (PoS) device (e.g., a cash register, etc.), a hard drive docking station, a storage device that may be used to house and connect hard disk drives (HDD) to other electronic devices, a computing device (i.e., a server, a desktop computer, workstation, personal device, a computer networking device, or any other processing device or equipment), etc.

In some examples, enclosure 500 forms an internal chamber (not visible in FIG. 1) that may house electrical components. For example, in examples where electronic device 1000 is a storage device, enclosure 500 may form an internal chamber to store at least one HDD. Enclosure 500 may have an opening that allows access to the internal chamber. In some examples, enclosure 500 may take the shape of a three-dimensional rectangular box with five sides that are relatively inaccessible to an outside environment (e.g., without accounting for air vents, ports, etc.), and the opening may be on the sixth side, allowing access to the internal chamber formed inside the enclosure. Cover 600 may interact with enclosure 500 such that cover 600 closes the opening, limiting access to the internal chamber and the corresponding electronic components stored in internal chamber.

Enclosure 500 may have an external wall 505 (shown in outline in FIG. 1). The external wall 505 may interact with the environment surrounding the electronic device 1000 and may comprise part of a surface that is accessible to a user of electronic device 1000. Enclosure may also have an internal wall 507 and a space between the external wall 505 and internal wall 507. In some examples, latch mechanism 200 resides in this space.

In some examples, and as shown in FIGS. 1 and 2, enclosure 500 may have an intermediate wall 506 that is between internal wall 507 and external wall 505. In these examples, latch mechanism 200 may reside between the space between intermediate wall 506 and internal wall 507. Intermediate wall 506 may extend along a portion of external wall 505 and internal wall 507, as represented by the gray outline in FIGS. 1 and 2. For example, intermediate wall 506 may not extend along the entire length of external wall 505 or along the entire length of internal wall 507. In some examples, intermediate wall may extend for the same length as a portion of the latch mechanism 200 (e.g., the entirety of latch mechanism 200 or a majority of latch mechanism 200). This allows intermediate wall 506 to provide extra protection for latch mechanism 200 from any force that is applied to external wall 505. In these examples with an intermediate wall 506, enclosure 500 may include a rail R to support the intermediate wall 506. In some examples, and as will be described below, some components of latch mechanism 200 are secured to either intermediate wall 506 or internal wall 507.

Latch mechanism 200 may allow for cover 600 to be secured to enclosure 500 to close the opening to the internal chamber of enclosure 500. As used herein, secure or secured is a connection between two parts such that the connection does not easily give way or become loose and the two parts that are secured together do not easily come apart without physical manipulation of the connection. This may allow for increased security of the electronic components stored in the internal chamber, such as HDDs. Latch mechanism 200 also allows for release of cover 600 from enclosure 500. FIG. 1 illustrates the latch mechanism 200 in a position in which cover 600 is secured on enclosure 500 and FIG. 2 illustrates latch mechanism 200 in a position in which cover 600 is released from enclosure 500.

In some examples, latch mechanism 200 includes a rotatable lever 210 and a moveable cam 230. In some examples, a retaining mechanism 240 may secure rotatable lever 210 to internal wall 507. For example, retaining mechanism 240 may be a nut that is placed into corresponding holes in rotatable lever 210 and internal wall 507 and held in place by a mating bolt. Other fastening hardware may also be used for retaining mechanism 240. Retaining mechanism 240 may hold rotatable lever 210 laterally in place such that rotatable lever 210 is laterally stationary in relation to enclosure 500. In other words, rotatable lever 210's ability to move up and down and left and right in relation to the retaining mechanism 240 is insignificant. However, retaining mechanism 240 allows rotatable lever 210 to rotate around the longitudinal axis of retaining mechanism 240, as indicated by arrows 210M and 210N in FIGS. 1 and 2. In some examples, rotatable lever 210 includes an end 210A shaped to engage with a protruding arm 602 of cover 600. In some examples, rotatable lever 210 also includes an end 210B to engage with cam 230.

As discussed above, latch mechanism 200 includes a cam 230. Cam 230 may include a rounded portion 230A that may engage with end 210B of rotatable lever 210. Cam 230 is moveable between a rest position and an engaged position. These movements are represented by arrow 230M in FIG. 1 and arrow 230N in FIG. 2. In the rest position, as shown in FIG. 1, rounded portion 230A does not engage with rotatable lever 210. In the engaged position, as shown in FIG. 2, cam engages with rotatable lever 210 through movement in the direction of arrow 230M. Movement in the direction of arrow 230M allows cam 230 and specifically rounded portion 230A to engage with end 210B of rotatable lever 210, causing rotation of rotatable lever in the direction of arrow 210M. The rotation of rotatable lever in the direction of arrow 210M disengages end 210A of rotatable lever 210 from protruding arm 602 of cover 600. This allows cover 600 to be released from enclosure 500.

Rotatable lever 210 may be biased to secure cover 600 to enclosure 500. In some examples, the bias may be provided by a spring 220 secured to rotatable lever 210. In some examples, and as shown in FIGS. 1 and 2, spring 220 may be also be secured to intermediate wall 506. Thus, the force of spring 220 pulls on rotatable lever 210 such that rotatable lever 210 is biased to engage with protruding arm 602. The movement of cam 230 in the direction of arrow 230M causes the rotation 210M of rotatable lever 210, which extends spring 220. Rotatable lever 210 then moves against the bias provided by spring 220 due to the force applied to end 210B by rounded portion 230A of cam 230. Upon removal of the force applied to end 210B by rounded portion 230A of cam 230, rotatable lever 210 is biased by spring 220 back to the position illustrated in FIG. 1 to secure the cover 600 to enclosure 500. Accordingly, latch mechanism 200 allows for a cover to be automatically secured to the enclosure without further action from a user beyond placing the cover on the enclosure.

In some examples, cam 230 may also be biased by spring 220. For example, after movement of cam 230 in the direction of arrow 230M (such that cam 230 and rotatable lever 210 are in the engaged position illustrated in FIG. 2), spring 220 may bias rotatable lever 210 such that it rotates in the direction of arrow 210N, as shown in FIG. 2. Because end 210B is engaged with 230A, the rotation of end 210B will push cam 230 in direction of arrow 230N. While the figures show a coiled spring 220, other types of biasing mechanisms may be used, including but not limited to wave springs, leaf spring, etc.

In some examples, enclosure 500 may include a button 300. In some examples, button 300 is provided on an external surface of enclosure 500 that interacts with the environment. Button 300 is connected to cam 230 such that button 300 operates cam 230. For example, a user may push on button 300 to move cam 230 from its resting position to an engaged position (in direction of arrow 230M).

An operation of latch mechanism 200 will now be described in relation to FIGS. 1 and 2. In FIG. 1, cover 600 of electronic device 1000 is secured to enclosure 500. End 210A of rotatable lever 210 is engaged with protruding arm 602. To release cover 600 from enclosure 500, a user may actuate button 300 by pushing down on button 300. Button 300, as discussed above, is operatively connected to cam 230. As used herein, operatively connected includes a relationship between two objects such that an actuation of one object causes a change in function or location of the other object. The downward force applied on button 300 translates to cam 230, moving cam 230 in the direction of arrow 230M. The movement of cam 230 in direction of arrow 230M moves cam 230 from a rest position to an engaged position and rounded portion 230A of cam 230 engages with rotatable lever 210. Thus, cam 230 moves rotatable lever 210 in rotational direction of arrow 210M when cam 230 is in the engaged position. The rotation of rotatable lever 210 lifts end 210A up so end 210A disengages from protruding arm 602 of cover 600. Cover 600 is released from enclosure 500, as shown in FIG. 2. The rotation of rotatable lever 210 in direction of arrow 210M causes the extension of spring 220, moving rotatable lever 210 against the bias provided by spring 220.

Upon a release of button 300 by the user, the downward force applied to button 300 (and translated to cam 230) is removed. With the force removed, spring 220 moves back to its un-extended state, moving rotatable lever 210 in rotational direction of arrow 210N. Subsequently, end 210B engages with rounded portion 230A of cam 230, causing cam 230 to move in the direction of arrow 230N back to a rest position, as shown in FIG. 1. Accordingly, these structural aspects of latch mechanism 200 may work together to allow a cover release mechanism that automatically secures a cover to an enclosure while allowing a quick release of the cover to allow access to the opening. Electronic device 1000 may include any or all structural features of electronic device 2000, electronic device 3000, and/or electronic device 4000.

Figure 3:
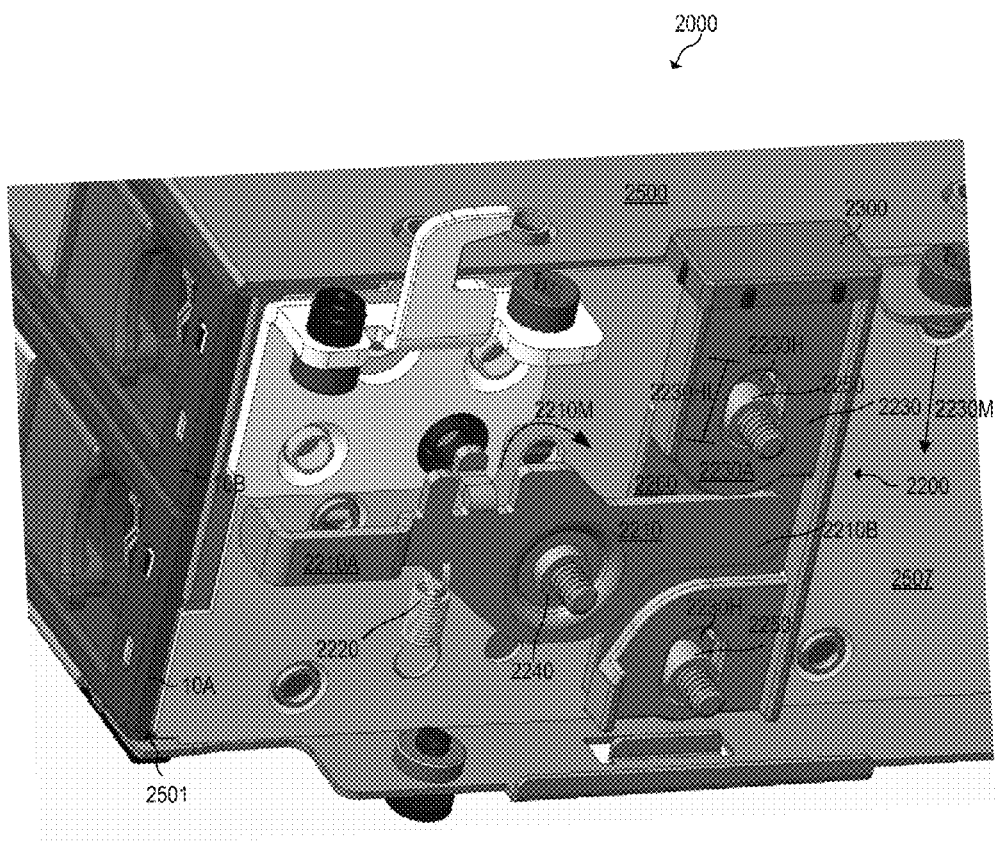
FIG. 3 illustrates an electronic device with an external wall of the electronic device removed, according to some examples.

FIG. 3 illustrates an electronic device 2000. Electronic device 2000 comprises an enclosure 2500 and a latch mechanism 2200. Like electronic device 1000, electronic device 2000 also comprises an internal wall 2507, an external wall, and an intermediate wall. External wall and intermediate wall of enclosure 2500 are not shown in FIG. 3 for clarity. Enclosure 2500 has an opening 2501 that allows access to an internal chamber. Electronic device 2000, like electronic device 1000, may be a PoS device (e.g., a cash register, etc.), a hard drive docking station, a storage device that may be used to house and connect HDDs to other electronic devices, or a computing device (e.g., a server, a desktop computer, workstation, personal device, a computer networking device, or any other processing device or equipment). In examples where electronic device 2000 is a storage device, and as shown in FIG. 3, opening 2501 may allow access to at least one HDD 10A held in the internal chamber of enclosure 2500. In some examples, opening 2501 may allow access to two HDDs 10A and 10B.

Latch mechanism 2200, like latch mechanism 200, includes a rotatable lever 2210 and a cam 2230. Rotatable lever 2210 may include end 2210A that interacts with a portion of a cover placed over opening 2501. Rotatable lever 2210 may also include end 2210B that interacts with cam 2230. Additionally, rotatable lever 2210, like rotatable lever 210, may be secured to internal wall 2507 via retaining mechanism 2240 such that rotatable lever is rotatable about the longitudinal axis of retaining mechanism 2240 but unable to move up and down or left and right relative to the retaining mechanism 2240. Accordingly, rotatable lever 2210 is similar to rotatable lever 210.

Cam 2230 may include rounded portion 2230A that interacts with end 2210B of rotatable lever 2210. Additionally, cam 2230, like cam 230, is moveable between a first position and a second position. The first position of cam 2230 is illustrated in FIG. 3. By moving cam 2230 in a direction indicated by arrow 2230M, cam 2230 may be moved to the second position. In some examples, and as shown in FIG. 3, cam 2230 may be an elongated bracket with holes 2230H. Holes 2230H may be elongated or oval-shaped. The elongation of bracket of cam 2230 and the holes 2230H may be parallel to a direction of arrow 2230M. Accordingly, holes 2230H may have diameters 2230HL in a direction that is parallel to the direction of arrow 2230M.

Bracket (cam) 2230 may sit on top of a retaining bracket 2260. Retaining bracket 2260 may be secured to internal wall 2507 through retaining mechanisms 2250 such that retaining bracket 2260 is stationary with regard to internal wall 2507. In some examples, retaining mechanisms 2250 may be a nut placed in holes of the retaining bracket 2260 and internal wall 2507, and held by a mating bolt. Other fastening hardware may also be used for retaining mechanisms 2250. Bracket (cam) 2230 may interlock with retaining bracket 2260 such that bracket 2230 may move in relation to retaining bracket 2260 but may not disconnect from retaining bracket 2260. The amount of movement by bracket (cam) 2230 may be modified by a size of diameter 2230HL of holes 2230H. A larger diameter 2230HL will allow for further movement in direction of arrow 2230M as compared to a smaller diameter 2230HL. In some examples, diameters 2230HL are sized to allow sufficient movement of cam to translate to a rotation of rotatable lever 2210 that allows end 2210A of rotatable lever 2210 to disengage with a cover secured on enclosure 2500.

Enclosure 2500 also includes button 2300. Button 2300 is operatively connected to cam 2230 and may be used to move cam 2230 (e.g., by a user pushing on button 2300). Like latch mechanism 200, latch mechanism 2200 may also be biased. In some examples, rotatable lever 2210 may be biased to secure the cover to the enclosure. In some examples, cam 2230 may also be biased in the first position, as shown in FIG. 3. The bias of rotatable lever 2210 and cam 2230 may be provided by a spring 2220. Like spring 220, spring 2220 may be secured to rotatable lever 210 at one end of the spring and secured to an intermediate wall of enclosure 2500 at the other end of the spring.

To operate latch mechanism 2200, a user may depress button 2300. This depression slides bracket (cam) 2230 over retaining bracket 2260 in the direction of arrow 2230M. Thus, bracket (cam) 2230 is moved from the first position that is illustrated in FIG. 3 to a second position. Rounded portion 2230A engages with end 2210B of rotatable lever 2210, moving rotatable lever in the direction of arrow 2210M. This allows end 2210A to move up and disengage with a portion of a cover, thus releasing the cover from the enclosure 2500. When the user releases button 2300, the bias of spring 2200 may move rotatable lever in the opposite direction of arrow 2210M, allowing end 2210B of rotatable lever 2210 to move bracket (cam) 2230 from the second position back to the first position (as illustrated in FIG. 3). Accordingly, latch mechanism 2200 is biased towards a position that secures a cover to enclosure 2500 and provides an automatic securing feature for a cover that is attached to enclosure 2500. This may allow for increased security of any electric components (e.g., HDD) that are stored in enclosure 2500. Specifically, latch mechanism 2200 provides for a securing feature that does not require additional actions by a user beyond that of placing a cover onto the enclosure 2500 (e.g., an additional step of using a keyed lock is not required). Electronic device 2000 may include any or all structural features of electronic device 1000, electronic device 3000, and/or electronic device 4000.

Figure 4:
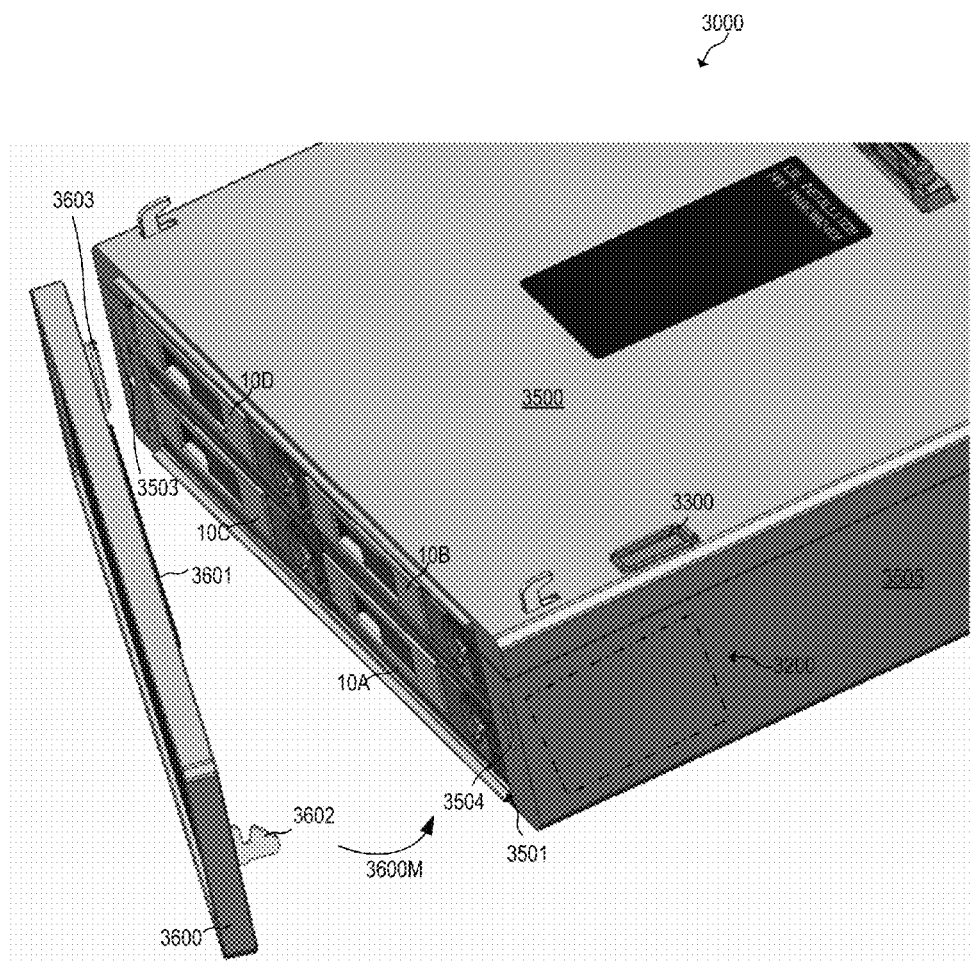
FIG. 4 illustrates an electronic device with a cover removed from the electronic device, according to some examples.

FIG. 4 illustrates an electronic device 3000. Electronic device 3000 comprises an enclosure 3500 with an opening

3501 to an internal chamber, a latch mechanism 3200, a cover 3600 to close the opening 3501, and a button 3300 to actuate the latch mechanism 3200. Electronic device 3000, like electronic devices 1000 and 2000, may be a PoS device (e.g., a cash register, etc.), a hard drive docking station, a storage device that may be used to house and connect HDDs to other electronic devices, or a computing device (e.g., a server, a desktop computer, workstation, personal device, a computer networking device, or any other processing device or equipment). In examples where electronic device 3000 is a storage device, and as shown in FIG. 4, opening 3501 may allow access to at least one HDD 10A held in the internal chamber of enclosure 3500. While FIG. 4 shows four HDDs 10A-10D held in internal chamber, electronic device 3500 is not limited to the number of HDD shown.

Latch mechanism 3200 may be similar to latch mechanism 200 and/or latch mechanism 2200. Button 3300 may be similar to button 300 and/or button 2300. Cover 3600 may be shaped and sized as to correspond to the shape and size of opening 3501. While FIG. 4 illustrates opening 3501 and cover 3600 to have a rectangular shape, opening 3501 and cover 3600 may have other shapes (e.g., square, etc.)

Cover 3600 may include a protruding arm 3602 on one end of cover to engage with latch mechanism 3200. In some examples, and as shown in FIG. 4, protruding arm 3602 is in the shape of a hook so as to have engaging surfaces to lock with corresponding surfaces in the latch mechanism. Enclosure may have a hole 3504 for protruding arm 3602 to be inserted. Hole 3504 may open up in the internal space of enclosure 3500 to latch mechanism 3200 such that protruding arm 3602 may engage with latch mechanism 3200.

Cover 3600 may also include a guiding flange 3603 on an end opposite to the location of protruding arm 3602. Guiding flange 3603 may act as a guide to help a user place cover 3600 over opening 3501. Accordingly, in some examples, enclosure 3500 may have a corresponding guiding hole 3503 as a receptacle to receive guiding flange 3603. Thus, to mate cover 3600 with opening 3501, a user may insert the guiding flange 3603 into guiding hole 3503 and insert protruding arm 3602 into hole 3504. In some examples, due to the shape of protruding arm, a user may rotate cover 3600 in the direction of arrow 3600M to have the protruding arm 3602 interact with the shape of the rotatable lever on the latch mechanism.

In some examples, cover 3600 does not have guiding flange 3603 and enclosure 3500 does not have guiding hole 3503. In yet other examples, cover 3600 does not have guiding flange 3603 but has another protruding arm in place of guiding flange 3603. In these examples, enclosure 3500 may include a latch mechanism that is similar to latch mechanism 3200 on the same side and location of the enclosure as the guiding hole 3503 to engage with the additional protruding arm.

In some examples, and as illustrated in FIG. 4, cover 3600 may have a gasket 3601 that lines the upper boundary of cover 3600. In some examples, gasket 3601 may be comprised of a spring material that biases the cover 3600 away from enclosure 3500. Thus, when latch mechanism releases cover 3600 from enclosure 3500, gasket 3601 may push cover 3600 away from enclosure 3500. This may indicate to a user that the cover 3600 is released from secure attachment to enclosure 3500. Electronic device 3000 may include any or all structural features of electronic device 1000, electronic device 2000, and/or electronic device 4000.

Figure 5:
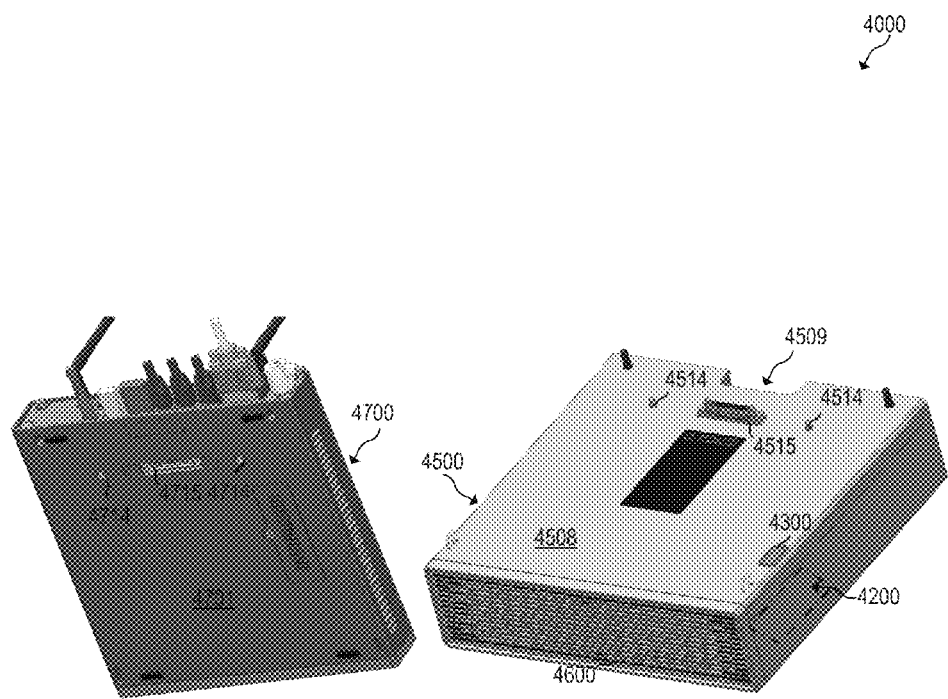
FIG. 5 illustrates an electronic device with a first housing and a second housing, according to some examples.

FIG. 5 illustrates an electronic device 4000 with a first housing 4500 and a second housing 4700. In some examples, electronic device 4000 is a computing device. As used herein, a "computing device" may be a server, computer networking device, chip set, desktop computer, workstation, personal device, PoS device, etc., or any other processing device or equipment. In some examples, second housing 4700 may house the processing components and first housing 4500 may house related storage space (e.g., HDD).

First housing 4500 may include a first surface 4508, a button 4300 provided on first surface 4508, a cover 4600 secured to first housing 4500, an end 4509 that is opposite cover 4600, a latch mechanism 4200, electrical connector 4515, and screws 4514. In some examples, first housing 4500 may be similar in shape to enclosure 500, enclosure 2500, and/or enclosure 3500. Latch mechanism 4200 may be similar to latch mechanism 200, latch mechanism 2200, and/or latch mechanism 3200. Cover 4600 may be similar to cover 600 and/or cover 3600. Button 4300 may be similar to button 300, button 2300, and/or button 3300.

Second housing 4700 may include a second surface 4701. In some examples, and as shown in FIG. 5, second housing 4700 may include connection points 4714, and electrical connector 4715 provided on second surface 4701.

In operation of electronic device 4000, first housing 4500 may be electrically connected to second housing 4700 such that the processing components housed in the second housing 4700 may communicate with the storage components housed in the first housing 4500. In some examples, first housing 4500 may be removably attached to the second housing through connecting the first surface 4508 (on the first housing 4500) to the second surface 4701 (on the second housing 4700). For example, electrical connector 4515 may be connected to electrical connector 4715. Additionally, screws 4514 may be connected to connection points 4714, which may be drilled holes sized to receive the screws. Accordingly, in some examples, when first housing 4500 is removably attached to second housing 4700, first surface 4508 and second surface 4701 may be connected such that first surface 4508 and second surface 4701 are continuous with each other. Accordingly, because first surface 4508 (with button 4300) is continuous with second surface 4701, button 4300 is inaccessible to a user. In other words, the connection of the first surface 4508 to second surface 4701 blocks access to the button 4300. In other examples, first surface 4508 and second surface 4701 may be connected but there may be some space between first surface 408 and second surface 4701. However, in these examples, the space is minimal and does not allow a user to access to button 4300. Thus, in these examples, the connection of the first surface 4508 to second surface 4701 also blocks access to button 4300. Accordingly, the location of button 4300 on first housing 4500 provides a security measure for the HDD housed in first housing 4500. Because second housing 4701 blocks access to button 4300 when second housing 4701 is removably attached to first housing 4500, cover 4600 cannot be open and the HDD accessed when electronic device 4000 is in use.

Figure 6A:
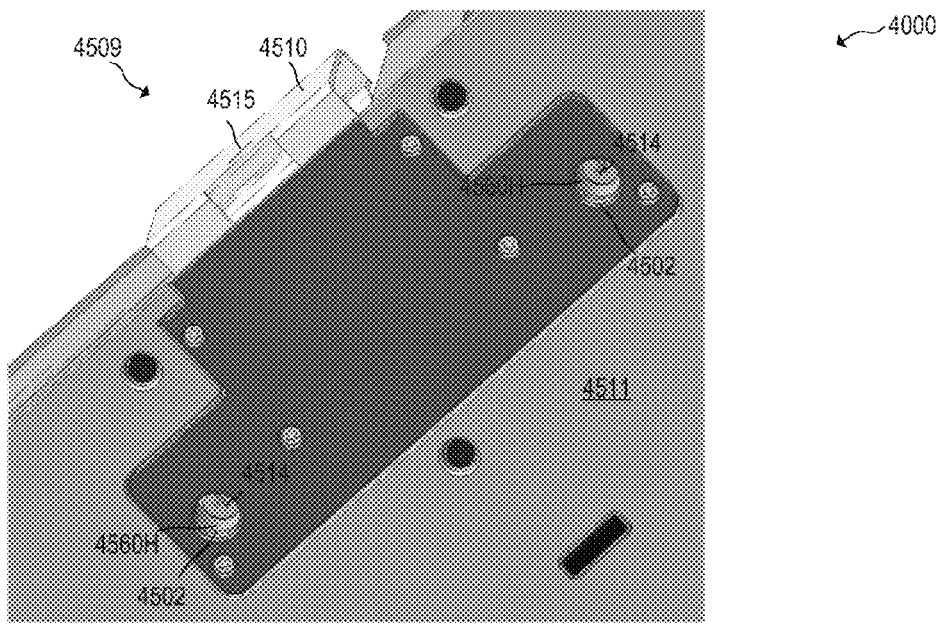
FIG. 6A illustrates the electronic device shown in FIG. 5 with access points that are accessible, according to some examples.
Figure 6B:
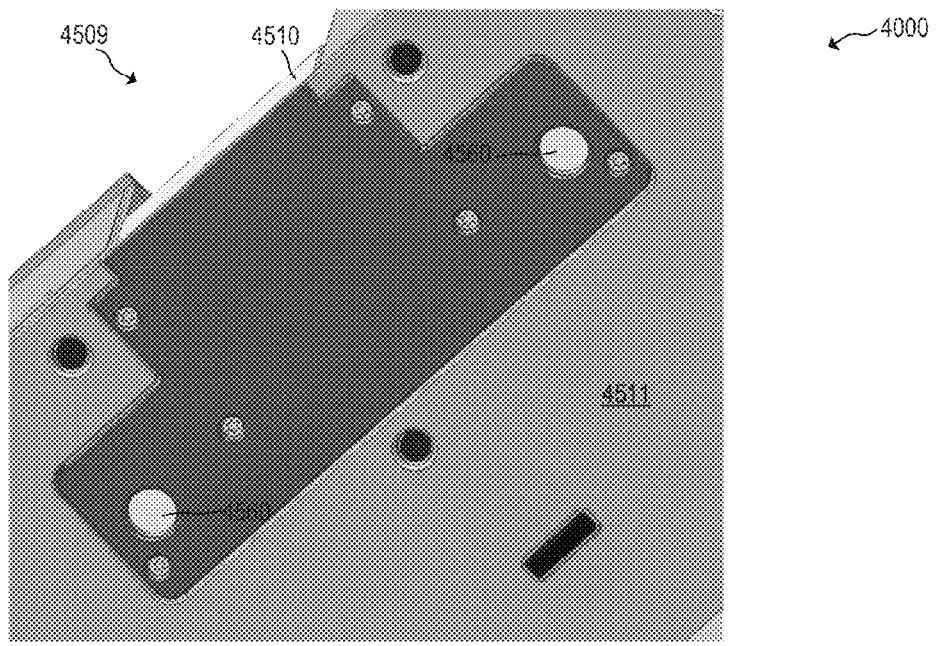
FIG. 6B illustrates the electronic device shown in FIG. 5 with the access points blocked, according to some examples.

Additional security measures are provided by end 4509 of first housing 4500. FIGS. 6A and 6B show up-close views of end 4509 of electronic device 4000. End 4509 of first housing 4500 may include a handle 4510 that may be selectively operated to block access to screws 4514 that removably attach first housing 4500 to second housing 4700.

In some examples, first housing 4500 may include a third surface 4511. This surface is opposite first surface 4508. In some examples, first surface 4508 may be characterized as a "top surface" of first housing 4500 and third surface 4511 may be characterized as a "bottom surface" of first housing 4500.

In some examples, screws 4514 are recessed screws. Accordingly, the heads of screws 4514 are retracted in relation to the third surface 4511. In other words, the heads of the screws are not flush with the third surface 4511 but are retracted in relation to third surface 4511. Access points 4502 are provided in surface 4511 to allow a user to access the heads of recessed screws 4514. In some examples, access points 4502 may be holes that are formed in surface 4511 sized and shaped to receive screws 4514. Handle 4510 may be connected to a plate 4560 (not visible in FIG. 6A). Plate 4560 may have holes 4560H that are shaped to encompass holes 4502. Handle 4510 may slide into an extended position, as shown in FIG. 6A, or into a retracted position, as shown in FIG. 6B.

In some examples, in the extended position as shown in FIG. 6A, holes 4560H in plate 4560 are aligned with access points 4502. Accordingly, the heads of recessed screws 4514 are accessible. A user may accordingly screw in screws 4514 to removably attach first housing 4500 to second housing 4700 (e.g., using a screwdriver, etc.). In some examples, in the retracted position shown in FIG. 6B, holes 4560H in plate 4560 are not aligned with access points 4502. Accordingly, access points 4502 are blocked by plate 4560 and a user cannot access the screws 4514 to removably attach first housing 4500 to second housing 4700.

Referring back to FIG. 6A, handle 4510 may also include a slot 4515. As will be described in relation to FIG. 7, handle 4510 may seat flush with an internal bracket, slot 4515 aligning with a slot in the internal bracket. Accordingly, slot 4515 may be used to place a keyed lock (e.g., a Kensington cable lock) to prevent a user from being able to slide the handle to its extended position and exposing the access points 4502.

Figure 7:
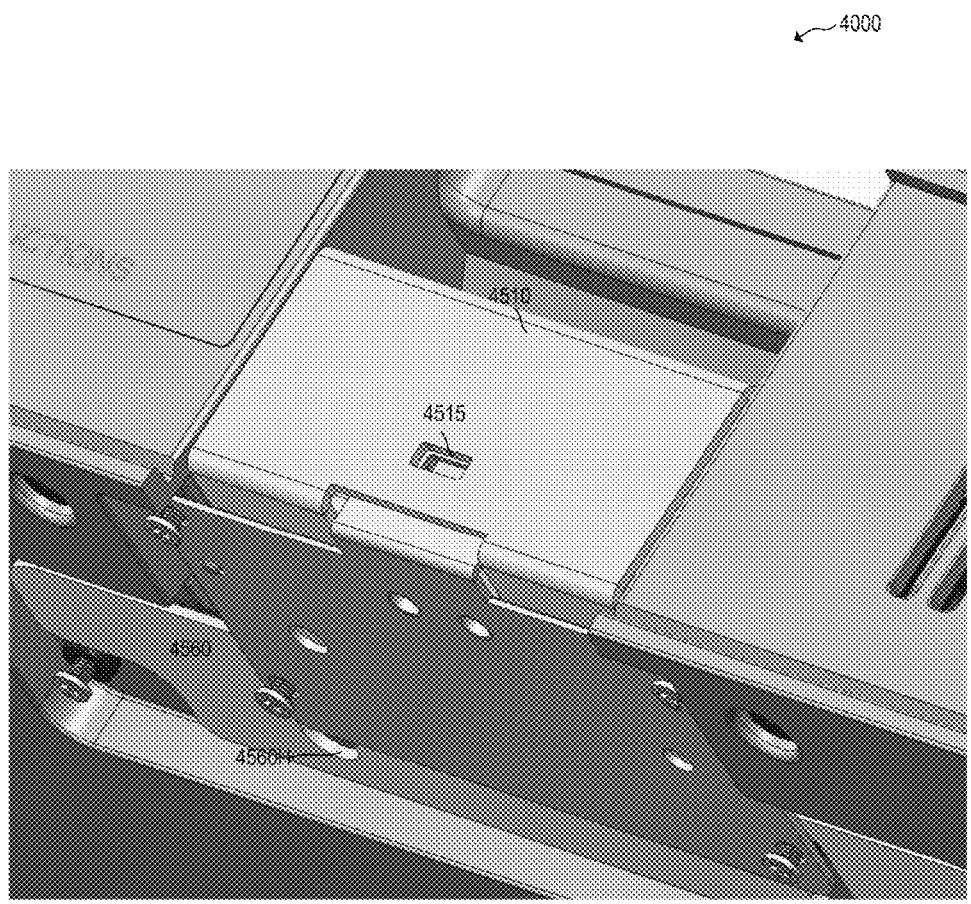
FIG. 7 illustrates the electronic device shown in FIG. 5 with a bottom surface of the electronic device removed, according to some examples.

FIG. 7 illustrates electronic device 4000 of FIG. 5, with third surface 4511 removed for clarity. Thus, plate 4560 may be seen in FIG. 7. Additionally, the seating of handle 4510 flush against internal bracket may be seen. Accordingly, handle 4510, access points 4502, and slot 4515 provide further security measures to electronic device 4000. With a key in slot 4515, a user is unable to slide out handle 4510 to expose access points 4502. Accordingly, a user is unable to remove the second housing from the first housing. Thus, not only is the second housing secured to the first housing, allowing for operation of electronic device 4000 but button 4300 also remains inaccessible, allowing for cover 4600 to block access to internal chamber of first housing 4500. Electronic device 4000 may include any or all structural features of electronic device 1000, electronic device 2000, and/or electronic device 3000.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An electronic device comprising: an enclosure with an opening; a cover; and a latch mechanism, the latch mechanism comprising: a rotatable arm; a spring to bias the rotatable arm to secure the cover to the enclosure; a cam moveable between a rest position and an engaged position, wherein in the engaged position, the cam moves the rotatable arm to release the cover; and a button to move the cam; wherein a housing is removably attached to the enclosure, the housing blocks access to the button.

2. The electronic device of claim 1, wherein the enclosure comprises an access point to removably attach the housing to the enclosure.

3. The electronic device of claim 2, wherein the enclosure comprises a handle slidable to block the access point.

4. The electronic device of claim 2, wherein the access point comprises a recessed screw.

5. The electronic device of claim 2, wherein the handle comprises a slot for a lock.

6. The electronic device of claim 1, wherein the enclosure comprises:
an external wall;
an internal wall; and
a space between the external wall and the internal wall, wherein the latch mechanism is located in the space.

7. The electronic device of claim 1, wherein the cover closes the opening to the enclosure.

8. The electronic device of claim 1, wherein the cover comprises a gasket.

9. An electronic storage device comprising: an enclosure with an opening; a cover with a protruding arm; and a latch mechanism to secure the cover to the enclosure, the latch mechanism comprising: a rotatable lever biased to engage with the protruding arm; a cam biased in a first position and moveable between the first position and a second position, wherein in the second position, the cam moves the rotatable lever to disengage the protruding arm; and a button to move the cam; wherein a housing is removably attached to the enclosure, the housing blocks access to the button.

10. The electronic device of claim 9, wherein the enclosure comprises:
an external wall;
an internal wall; and
a space between the external wall and the internal wall, wherein the latch mechanism is located in the space.

11. The electronic device of claim 9, wherein the protruding arm is a hook.

12. The electronic device of claim 9, comprising a spring secured to the rotatable lever to bias the rotatable lever.

13. The electronic device of claim 9, wherein the cover comprises a spring gasket.

14. A computing device comprising: a first housing with an opening and a first surface; a second housing with a second surface, the second housing removably attached to the first housing through a connection of the first surface to the second surface; a cover to close the opening; and a latch mechanism to secure the cover to the first housing, the latch mechanism comprising: a button on the first surface; a rotatable lever biased to secure the cover to the second housing; and a cam operatively connected to the button and moveable between a rest position and an engaged position, wherein in the engaged position, the cam moves the rotatable arm to release the cover from the first housing; wherein the first housing comprises an access point to connect the first surface and the second surface; and wherein the first housing comprises a handle slidable to block the access point.

15. The electronic device of claim 14, wherein the connection of the first surface to the second surface blocks access to the button.

* * * * *